United States Patent Office 3,288,823
Patented Nov. 29, 1966

3,288,823
2,6-BIS(HYDROXYMETHYL)NAPHTHALENE
AND ESTERS THEREOF
William D. Vanderwerff, Wilmington, Del., assignor to Sun Oil Company, Philadelphia, Pa., a corporation of New Jersey
No Drawing. Filed Mar. 22, 1963, Ser. No. 267,311
2 Claims. (Cl. 260—410.5)

This application is a continuation-in-part of application Serial No. 152,136, filed January 22, 1962, now abandoned.

This invention relates to new compositions of matter comprising 2,6-bis(hydroxymethyl)naphthalene and esters thereof.

The formula for the compound according to one embodiment of the invention is as follows:

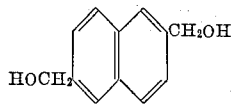

The invention also contemplates esters of the above compound, which esters have the formula:

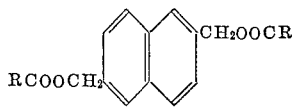

where R is a hydrocarbon radical preferably having 1 to 12 carbon atoms, e.g. methyl, ethyl, isopropyl, 2-ethylhexyl, n-dodecyl, phenyl, benzyl, p-methylphenyl, cyclohexyl, etc.

The compound according to the invention can be prepared, for example, by oxidation of 2,6-dimethylnaphthalene with selenium dioxide to form 2,6-naphthalenedicarboxaldehyde, and reduction of the latter to 2,6-bis(hydroxymethyl)naphthalene, using sodium borohydride as reducing agent. Alternatively, the 2,6-naphthalenedicarboxaldehyde can be prepared by reaction of 2,6-dimethylnaphthalene with N-bromosuccinimide to introduce two bromine atoms into each of the ring methyl groups, and hydrolysis of the resulting compound to form 2,6-naphthalenedicarboxaldehyde; and the latter can be reduced as before to 2,6-bis(hydroxymethyl)naphthalene.

The 2,6-naphthalenedicarboxaldehyde referred to above has the following formula:

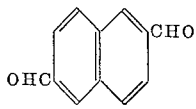

The compounds according to the invention, 2,6-bis(hydroxymethyl)naphthalene and its esters, are useful monomers in the preparation of polyesters and other types of synthetic polymers. Thus, for example, the monomer may be reacted with dibasic acid, e.g. adipic acid, succinic acid, terephthalic acid, 2,6-naphthalenedicarboxylic acid, etc., to form a polyester. 2,6-bis(hydroxymethyl)naphthalene may also be reacted with diisocyanates to form polyurethanes, and may be used as modifier in various known types of polymerization.

The following examples illustrate the invention:

Example 1

The following is the preparation of 2,6-naphthalenedicarboxaldehyde by oxidation of 2,6-dimethylnaphthalene:

110 g. of selenium and 1600 ml. of 1,2,4-trichlorobenzene are charged to a 3-liter cylindrical reactor equipped with a high speed turbine stirrer, baffles and a gas inlet tube below the stirrer. The mixture is heated to 200° C. and the selenium oxidized to selenium dioxide by a stream of $NO_2$. The $NO_2$ is purged from the reactor by a stream of nitrogen (which is maintained during the balance of the run). Then 95 g. of 2,6-dimethylnaphthalene dissolved in 400 ml. hot trichlorobenzene are added in 25 ml. portions over a period of 1½ hours at 200° C. and the mixture stirred at 200° C. for an additional hour, then filtered hot to remove selenium (102 g. recovered). Excess pentane is then added to the cooled filtrate to precipitate the product which is filtered off. The product is dissolved in methanol and filtered to remove traces of selenium, and stripping of the methanol leaves 60 g. of crude product. Subsequent recrystallization from methanol gives 2,6-naphthalenedicarboxaldehyde having melting point of about 172° C.

The following is the preparation of 2,6-bis(hydroxymethyl)naphthalene by reduction of the 2,6-naphthalenecarboxaldehyde produced above:

The 2,6-naphthalenedicarboxaldehyde is reduced with excess sodium borohydride in ethanol on a steam bath, excess borohydride decomposed with acetic acid, and the mixture poured into cold water to precipitate the product which is then recrystallized from ethanol as colorless prisms, having melting point of 170.0–170.5° C. Elemental analysis gives 76.82% carbon, 6.46% hydrogen, and 16.72% oxygen, as compared with theoretical 76.57% carbon, 6.43% hydrogen, and 17.00% oxygen.

Instead of preparing selenium oxide by $NO_2$ oxidation of selenium, preformed $SeO_2$ can be charged to the reactor in the above procedure for preparation of 2,6-naphthalenedicarboxaldehyde.

Instead of adding pentane and the subsequent procedure described above in the preparation of 2,6-naphthalenedicarboxaldehyde, the trichlorobenzene solution of the latter can be filtered to remove selenium, then heated under vacuum to distill off trichlorobenzene, followed by crystallization of the 2,6-naphthalenedicarboxaldehyde from methanol.

As an alternative reduction of the dialdehyde to that disclosed above, a solution of the dialdehyde in 95% ethanol can be treated with a platinum catalyst and 1 to 5 atmospheres of hydrogen at room temperature until the theoretical amount of hydrogen to make the 2,6-bis(hydroxymethyl)naphthalene is absorbed.

Example 2

10 g. of 2,6-dimethylnaphthalene, 40 g. of N-bromosuccinimide, 200 ml. of carbon tetrachloride and a few crystals of benzoyl peroxide are refluxed for 24 hours. The reaction product mixture is filtered hot and washed with hot carbon tetrachloride. Carbon tetrachloride is stripped from the product to obtain 27.6 g. of 2,6-bis(dibromomethyl)naphthalene, a white solid.

27 g. of the bis(dibromomethyl)naphthalene, 60 ml. of concentrated sulfuric acid, 200 ml. of water and 200 ml. of methnaol are refluxed for 22 hours. The reaction mixture is filtered hot, and the filtrate is cooled to precipitate a yellow solid constituting crude 2,6-naphthalenedicarboxaldehyde, melting point 166.5–168.0° C., and giving a positive 2,4-dinitrophenylhydrazine test for aldehyde. The melting point of the 2,6-naphthalenedicarboxaldehyde, after crystallization from methanol-water, is 171.5–172.0° C.

The dialdehyde is reduced, by procedure previously described, to obtain 2,6-bis(hydroxymethyl)naphthalene.

Polyesters produced from the bis(hydroxymethyl) compound by reaction with adipic acid, for example, have highly symmetrical configuration, as a result of the position of the hydroxymethyl groups in the 2 and 6 positions of the naphthalene nucleus. As a result of this symmetrical structure, the polyesters have superior properties to those obtained from bis(hydroxymethyl)naphthalenes where the hydroxymethyl groups are in other positions, e.g., the 1, 8; 2, 3; or 2, 7 positions etc. These superior properties include higher melting point, greater heat resistance, hardness, etc.

2,6-bis(hydroxymethyl)naphthalene is also useful in protecting materials from attack by fungi. The compound may be used to treat plants for this purpose, or may be incorporated in paints, coatings, films and polymers to protect materials such as fibers, plastics, wood, cutting oils, adhesives etc. from fungal attack. The compound is effective against a variety of organisms including *Rhizopus stolonifer, Fusarium oxysporum, Alternaria solani* and *Aspergillus niger*. The compound may be applied to the material to be protected as an aqueous dispersion, e.g. of 0.2% concentration, or as solutions in suitable solvents such as alcohols, aromatic hydrocarbons etc. It may be employed in solid form as a dust or as granules or pellets, or may be incorporated in the composition to be protected during the compounding thereof.

The invention claimed is:
1. A compound having the formula

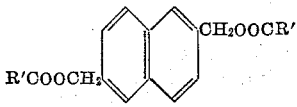

where R' is a hydrocarbon radical having 1 to 12 carbon atoms.

2. 2,6-bis(hydroxymethyl)naphthalene.

References Cited by the Examiner
UNITED STATES PATENTS

| 2,399,716 | 5/1946 | Adams | 260—618 |
| 2,598,406 | 5/1952 | Martin | 260—488 X |
| 3,048,600 | 12/1962 | Jaruzelski | 260—410.5 X |

FOREIGN PATENTS

| 1,014,982 | 2/1958 | Germany. |
| 789,381 | 1/1958 | Great Britain. |
| 913,855 | 12/1962 | Great Britain. |

OTHER REFERENCES

Lock et al.: "Ber. Deut. Chem. Ges.," vol. 75B, pp. 1161–2 (1942).

Weygand et al.: "Ber. Deut. Chem. Ges.," vol. 83, pp. 394–9 (1950).

Lock et al.: Ibid, vol. 84, pp. 639–641 (1951).

Reid et al.: Ibid, vol. 89, pp. 708–12 (1956).

LEON ZITVER, *Primary Examiner.*

M. B. ROBERTO, J. M. BANE, T. G. DILLAHUNTY,
*Assistant Examiners.*